(12) United States Patent
MacInnis et al.

(10) Patent No.: US 8,928,804 B2
(45) Date of Patent: Jan. 6, 2015

(54) MANAGING ENCODER PARAMETERS FOR PARALLEL TRANSCODING

(71) Applicant: Broadcom Corporation, Irvine, CA (US)

(72) Inventors: Alexander Garland MacInnis, Los Altos, CA (US); Hongtao Zhu, San Jose, CA (US); Jason William Herrick, Pleasanton, CA (US); Brian Francis Schoner, Fremont, CA (US); Junlin Li, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/840,026

(22) Filed: Mar. 15, 2013

(65) Prior Publication Data

US 2014/0139733 A1    May 22, 2014

Related U.S. Application Data

(60) Provisional application No. 61/727,919, filed on Nov. 19, 2012.

(51) Int. Cl.
| | |
|---|---|
| *H04N 7/01* | (2006.01) |
| *H04N 7/26* | (2006.01) |
| *H04N 19/40* | (2014.01) |
| *H04N 19/124* | (2014.01) |
| *H04N 19/146* | (2014.01) |
| *H04N 19/436* | (2014.01) |

(52) U.S. Cl.
CPC ..... *H04N 19/00472* (2013.01); *H04N 19/0009* (2013.01); *H04N 19/00169* (2013.01); *H04N 19/00521* (2013.01)

USPC ............ 348/441; 348/403.1; 348/400.1; 348/445; 375/240.1; 375/240.26; 382/234; 382/298

(58) Field of Classification Search
USPC ............ 348/441, 445, 400.1, 403.1, 404.1; 375/240.1, 240.03, 240.26; 382/234, 382/248, 298
See application file for complete search history.

(56) References Cited

U.S. PATENT DOCUMENTS 8,175,167 B2 *    5/2012    Bouton et al. ........... 375/240.26

* cited by examiner

*Primary Examiner* — Jefferey Harold
*Assistant Examiner* — Jean W Desir
(74) *Attorney, Agent, or Firm* — Foley & Lardner LLP

(57) ABSTRACT

Disclosed are various embodiments directed to transcoding a bit stream in parallel. A bit stream may be divided into a plurality of segments, where a plurality of transcoders encode at least a portion of the segments in parallel. If encoding is performed using variable bit rate (BR) encoding, each encoder may encode a segment and vary a BR for the segment. A measured average BR is compared with a target average BR to determine whether to adjust a video quality level (VQL) or any other encoder parameter. A relatively constant subjective quality may be maintained using variable BR encoding while achieving a target average BR. When using constant BR encoding, a VQL or other encoder parameter is used by encoders to achieve relatively constant subjective quality. For example, a relatively continuous quantization parameter between adjacent encoded segments may be achieved.

18 Claims, 10 Drawing Sheets

US 8,928,804 B2

MANAGING ENCODER PARAMETERS FOR PARALLEL TRANSCODING

CROSS-REFERENCE TO RELATED APPLICATIONS

This application is a utility application that claims priority to U.S. Provisional Patent Application titled, "Managing Encoder Parameters for Parallel Transcoding", having Ser. No. 61/727,919, filed Nov. 19, 2012, which is entirely incorporated herein by reference.

BACKGROUND

Media items such as movies, television shows, music, etc. may be digitally stored as media files in various file formats. Media devices that playback these media files may be limited to a set of file formats that are supported by the media device. For example, a media device may not support particular formats such as, for example, high definition, high frame rates, various compression formats, etc. To successfully play back media files in such devices, the media files may need to be transcoded. Transcoding is a process that relates to converting a file from one format into another format. Transcoding may involve completely decoding each picture or audio frame of a media file to a raw format, processing the raw format by performing any number of specified operations, and encoding the raw format to a target format. Media devices may have limited storage capacity, and it may be desirable to transcode media files into a format with a smaller file size. By performing transcoding on a media file, the media file may be converted from an unsupported file format to a supported file format, the media file may be converted from a larger file size to a smaller file size, or may otherwise undergo another type of conversion.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
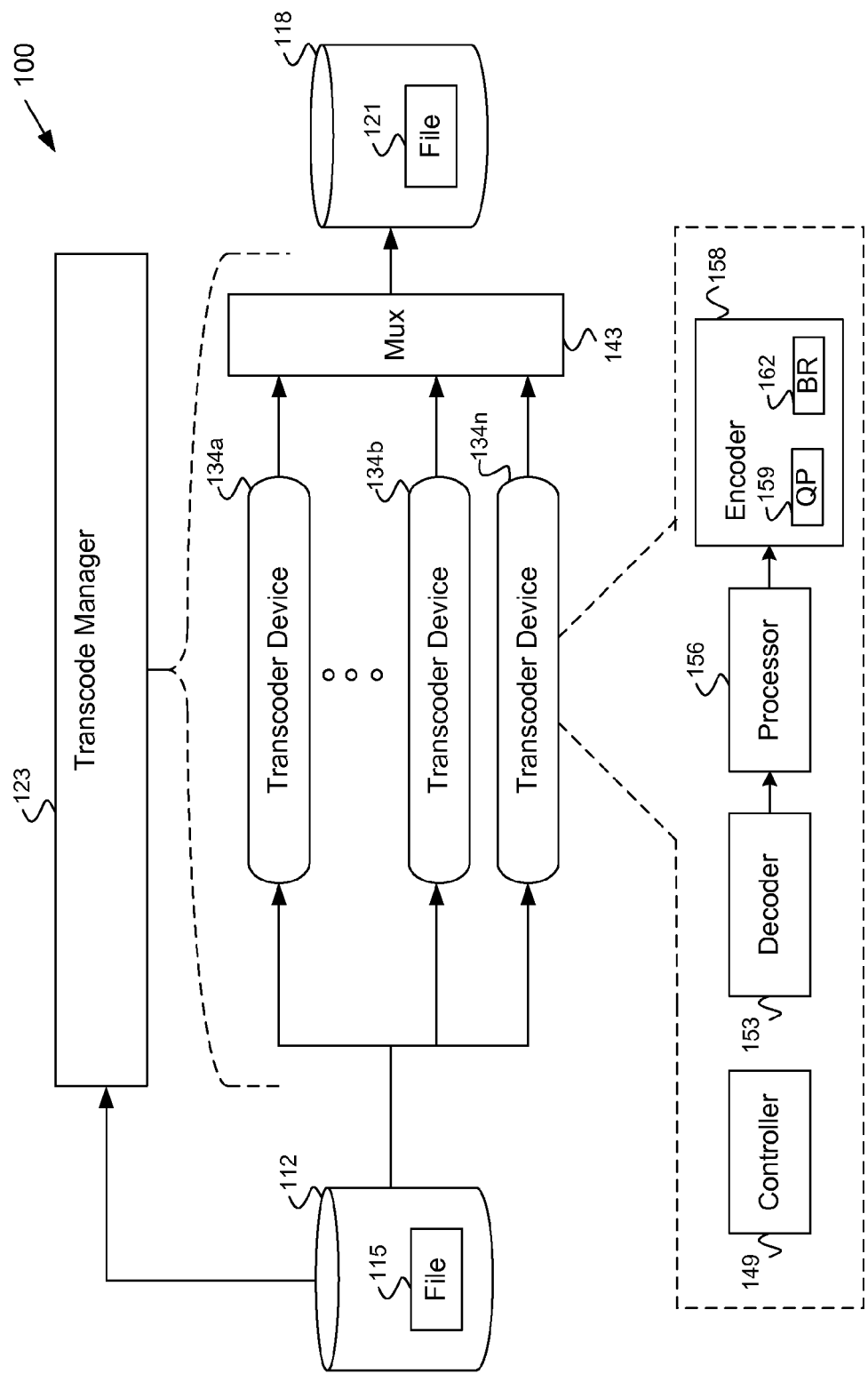
FIG. 1 is a drawing of an example of a transcoding system, in accordance with various embodiments of the present disclosure.

The present disclosure relates to transcoding a media file to generate a transcoded media file. A media item such as, for example, a video, image, picture, graphic, television show, movie, song, audio content, audio book, etc., may be stored as a digital file in a variety of formats or a combination of formats. For example, a media file may be encoded in accordance with a particular standard, file format, frame rate, media quality, or any other format for storing a digital media file. Media files stored in an original format may not be suitable for presentation in particular media devices, or they may be too large to store in particular media devices, or for any reason it may be desirable to reduce the size of the media files. Thus, a format conversion is required to modify the media file in order to render it presentable in a target media device or reduce the size of the media file to render it suitable for storage in or transmission to a target media device. Transcoding may be used to convert a file from one format to another format. In other embodiments, transcoding involves completely decoding the media file to a raw format, processing the raw format by performing any number of specified operations, and encoding the raw format to a target format. Alternatively, transcoding without completely decoding the media file may be used.

Various embodiments of the present disclosure are directed to employing a set of transcoding devices in parallel to transcode a media file. The media file may be formatted as a bit stream that is divided into a plurality of segments. Each segment may be allocated to an available transcoding device to generate a corresponding output segment. The output segments are encoded and then stitched together to generate an output file that is a transcoded version of the media file. Various embodiments of the present disclosure address managing encoder parameters such as, for example, a quantization parameter (QP), for each parallel transcoder to facilitate generating an output file that is uniform in terms of quality. If the boundaries of the output segments correspond to a relatively discontinuous QP, then the output media file may have a relatively low subjective quality. That is to say, a viewer playing back the output media file may notice visual artifacts if the QP were to jump between widely varying values. The present disclosure is directed to managing the QP to achieve a relatively high subjective quality during a parallel transcoding process. The QP may be managed in a constant bit rate system or alternatively, in a variable bit rate system. A constant bit rate system is a system that may use an encoding process where bits are outputted from a rate buffer at a constant rate. In this respect, the number of bits per unit time is at a constant value. In a variable bit rate system, bits are outputted from a rate buffer at a variable rate.

In some embodiments using a constant bit rate system or variable bit rate system, the QP for each transcoder device is directed to converge approximately to a particular QP range or value to achieve a relatively continuous QP between adjacent segments. The particular QP range may be determined based on an initial QP of a subsequent segment in presentation order. Alternatively, the initial QP of a subsequent segment in presentation order may be determined based on the particular QP range. To this end, the degree of discontinuity of QP may be reduced or otherwise minimized.

In yet other embodiments using a constant bit rate system or variable bit rate system, a relatively constant subjective video quality may be maintained including at the boundaries of output segments by initializing each encoding process with a video quality level. According to the video quality level, each encoder may choose a suitable QP or any other encoder parameter to achieve the video quality level. In this respect, each encoder may vary its respective QP independent of the QPs of other encoders. Furthermore, to maintain a target average bit rate (BR), the video quality level may be adjusted. For example, specifying an encoder to increase the video quality level may cause the encoder to reduce its QP. Thus, the video quality level may be based at least upon a QP value.

In embodiments using a variable bit rate system, the QP for each transcoding process may be managed while maintaining an average bit rate (BR). In this case, a video quality level may be used to achieve a target average BR while slowly varying the QP. By slowly varying the QP, a relatively continuous QP between adjacent segments may result while maintaining a target average BR.

Moving onto FIG. 1, shown is a drawing of an example of a transcoding system 100, in accordance with various embodiments of the present disclosure. A transcoding system 100 may be implemented as at least a portion of a set top box (STB), a media server, a television or another computing device configured to handle media files. The transcoding system 100 comprises a source memory storage 112, a destination memory storage 118, a transcode manager 123, a plurality of transcoder devices 134a-n, and a multiplexor (mux) 143.

Non-limiting examples of the source memory storage 112 are magnetic tapes, magnetic floppy diskettes, magnetic hard drives, memory cards, solid-state drives, USB flash drives, optical discs, or random access memory (RAM) including, for example, static random access memory (SRAM) and dynamic random access memory (DRAM), or magnetic random access memory (MRAM). In addition, the source memory storage 112 may be a read-only memory (ROM), a programmable read-only memory (PROM), an erasable programmable read-only memory (EPROM), an electrically erasable programmable read-only memory (EEPROM), or other type of memory device.

The source memory storage 112 is configured to store an input media file 115. The input media file 115 may represent an audio and/or video program such as, for example, a television show, a movie, a song, an audio book, etc. The source memory storage 112 may be implemented as a portion of an STB for storing broadcasted media. To this end, the input media file 115 may be a program transmitted to an STB over a network.

The destination memory storage 118 may comprise, for example, magnetic tapes, magnetic floppy diskettes, magnetic hard drives, memory cards, solid-state drives, USB flash drives, optical discs, or random access memory (RAM) including, for example, static random access memory (SRAM) and dynamic random access memory (DRAM), or magnetic random access memory (MRAM). In addition, the destination memory storage 118 may be a read-only memory (ROM), a programmable read-only memory (PROM), an erasable programmable read-only memory (EPROM), an electrically erasable programmable read-only memory (EEPROM), or other type of memory device.

The destination memory storage 118 is configured to store an output media file 121, which may include a transcoded version of the input media file 115. To this end, the output media file 121 expresses the same substantive content as the input media file 115. The output media file 121 may express a subset of the content of the input media file 115. However, the output media file 121 is encoded in a format that differs from the format of the input media file 115. A different format of the output media file 121 may conform to the same standard as the input media file 115 while having a different bit rate or file size. The destination memory storage 118 may be implemented in a media device that is separate from a media device that comprises the source memory storage 112. For example, the source memory storage 112 may be implemented as a portion of an STB and the destination memory storage 118 may be a remote media device such as a computing device configured to present the output media file 121 to a user. A media device may be, for example, a laptop computer, desktop computer, notepad, notebook, ultrabook, tablet, cellular telephone, personal digital assistant (PDA), STB, digital camera, portable media player, or any other computing device configured to playback a media file. Alternatively, the destination memory storage 118 may be implemented in a media device that is the same as a media device that comprises the source memory storage 112.

The transcode manager 123 is configured to manage the transcoding of the input media file 115. In various embodiments, the transcode manager 123 is implemented as at least a portion of a microprocessor. The transcode manager 123 may include one or more circuits, one or more microprocessors, or any combination thereof. In yet other embodiments, the transcode manager 123 may include one or more software modules executable within one or more processing circuits. The transcode manager 123 may further include computer-readable medium. The computer-readable medium may store instructions and/or code to cause the transcode manager 123 to manage transcoding operations in the transcoding system 100.

The transcode manager 123 may retrieve the input media file 115 and prepare the input media file 115 for transcoding. For example, the transcode manager 123 handles the input media file 115 as a digital bit stream and allocates segments of the bit stream to various transcoder devices 134a-n. For example, the transcode manager 123 may send a segment to a transcoder device 134a-n as a stream without specifying a segment length or ending point in the stream. When the transcoder device 134a-n is nearing completion of the transcoding process or has completed the transcoding process, the transcoder device 134a-n may indicate to the transcode manager 123 to stop feeding the input segment stream. Alternatively, the transcode manager 123 may allocate an input segment as a stream while specifying a default or nominal length/ending point. The transcode manager 123 is also configured to monitor each transcoder device 134a-n by managing one or more transcoder parameters.

The transcode manager 123 may be configured to initiate one or more transcoder processes for transcoding the input media file 115. Each transcoder process may be executed concurrently to processes portions of the input media file 115 in parallel. The transcode manager 123 may be configured to initiate one or more transcode processes by utilizing one or more transcoder devices 134a-n. Furthermore, the transcode manager 123 may operate a mux 143 for sequencing the outputs of the transcoder devices 134a-n for generating an output media file 121.

The mux 143 is configured to handle the outputs of each transcoder device 134a-n. The mux 143 may also assemble each of the outputs to generate the output media file. The output media file 121 may then be written to the destination memory storage 118. In various embodiments, the mux 143 is communicatively coupled to a memory buffer to store the transcoder device outputs in a queue.

The transcoding system 100 comprises a plurality of transcoder devices 134a-n. Each transcoder device 134a-n is configured to process portions of the input media file 115 to effectuate parallel transcoding. A transcoder device 134a-n performs one or more transcoder processes. In this respect, a transcoder device 134a-n may be configured to perform multiple transcoder processes in parallel to transcode various inputs concurrently. Each transcoder device 134a-n may be a video transcoder or an audio transcoder. In various embodiments, each transcoder device 134a-n is implemented as at least a portion of a microprocessor. Each transcoder device 134a-n may include one or more circuits, one or more microprocessors, or any combination thereof. To this end, the various transcoder devices 134a-n may be implemented by one circuit and/or microprocessor or may be implemented by multiple circuits and/or microprocessors such that the functionality of the transcoder devices 134a-n is distributed across one or more circuits and/or one or more microprocessors. In yet other embodiments, each transcoder device 134a-n may include one or more software modules executable within one or more processing circuits. Each transcoder device 134a-n may further include computer-readable medium. The computer-readable medium may store instructions and/or code to cause the transcoder device 134a-n to transcode portions of the input media file 115.

Each transcoder device 134a-n is configured to receive a segment of the input media file 115 and generate a corresponding output segment. Accordingly, the output segment is a transcoded version of the input segment. Each transcoder device 134a-n comprises a respective controller 149, a respective decoder 153, a respective processor 156, and a respective encoder 158.

The controller 149 for each transcoder device 134a-n provides an interface between the transcoder device 134a-n and the transcode manager 123. For example, the controller 149 may allow for a transcoder device 134a-n to be enabled or disabled. The controller 149 may indicate a transcoding progress of the transcoder device 134a-n to the transcode manager 123. The controller 149 may also maintain a workload queue of a transcoder device 134a-n that indicates an amount of work scheduled to be performed by a transcoder device 134a-n. Transcoding progress, for example, may indicate whether a transcoder is busy or not.

The decoder 153 of each transcoder device 134a-n is configured to decode and/or decompress received inputs into a raw format. For example, the decoder 153 portion of a video transcoder device 134a-n may convert input media file segments into raw pixel data.

The processor 156 of each transcoder device 134a-n is configured to process the raw outputs of the decoder 153. For video transcoder devices 134a-n, the processor 156 is a pixel processor that may perform pixel processing functions. Non-limiting examples of pixel processing are picture size adjustment, interlacing/de-interlacing, color space conversion, noise reduction, and image enhancement. Pixel processing may comprise changing a format. For example, a format change may be conversion to or from high definition (HD) and a different definition, conversion to or from standard definition (SD) and a different definition, conversion from 3D to 2D, de-interlacing, etc. After the processor 156 receives a decoded input media file segment and processes the input media file segment, the processor 156 sends the processed input media file segment as an output segment to the encoder 158.

The encoder 158 for each transcoder device 134a-n is configured to encode processed input media file segments by encoding the processed input media file segments to a target format. For video transcoders 134a-n, the encoder 158 encodes each output segment according to a quantization parameter (QP) 159 and a bit rate (BR) 162 that may be configured to vary. An encoder 158 may comprise a buffer such as, for example, a first-in-first-out (FIFO) buffer for accumulating encoded bits. The output of the buffer may be a bit stream characterized by a BR 162 and a QP 159. The BR may be defined as the rate at which bits are intended to be transmitted from a buffer and may be expressed as bits per unit time. The content in one or more pictures and/or the complexity of a video dynamically affect an appropriate BR 162 in the encoding process of a media file. The encoder 158 may vary the BR 162 to ensure that the buffer does not reach a state of underflow and/or overflow. The encoder 158 may also vary the BR 162 to ensure that the bit stream confirms to a particular video standard, to achieve a particular average BR, to maximize video quality, or any combination thereof. The encoder 158 may also vary the QP 159 to control a degree of quality expressed in the output of the encoder 158.

Although the encoder 158 of each transcoder device 134a-n may dynamically adjust the QP 159, the transcode manager 123 may also control the QP 159 for each encoder 158. In various embodiments, the transcode manager 123 initializes each QP 159 to an initial value for controlling the uniformity of each QP 159 from one segment to the next. The initial values of QP 159 of various segments may differ. The transcode manager 123 may force or otherwise direct the QP 159 of each encoder 158 to converge to a predetermined QP range. The predetermined QP range that applies to one segment may be based on the initial QP value of the subsequent segment in presentation order. In this respect, an encoder 158 is instructed to cause the QP 159 associated with the end of a segment to fall generally within a predetermined QP range.

In other embodiments, the transcode manager 123 directs the QP 159 while maintaining a target average BR across the transcoder devices 134a-n. In this case, the transcode manager 123 assigns a nominal QP value to one or more encoders 158 to achieve a relatively continuous QP 159 across segment boundaries in the output media file 121. The nominal QP value so assigned may differ between segments. The nominal QP may function as a baseline value. An encoder 158 may deviate from the nominal QP as long as the encoder 158 attempts to return to the nominal QP at the end of the segment. The rate of change of nominal QP values assigned by the transcode manager 123 may be limited by a predetermined maximum rate. By slowly varying the nominal QP, a relatively continuous QP 159 may be maintained between adjacent output segments. The transcode manager 123 may assign a nominal QP to one or more transcoder devices 134a-n in response to comparing the average BR of a given averaging function to a target average BR. Alternatively, an average BR may be determined using a recursive filter, by measuring the bit rate of the output file, or any other function for determining a BR of a portion of the bit stream. The transcode manager 123 may determine an average BR for a set of sequential output segments, where the output segments are sequential in terms of a presentation order. The transcode manager 123 may then determine an average BR according to an averaging window, where the average window is expressed as a length of time that covers the set of output segments. The transcode manager 123 may determine both a longer term average BR, for example averaged over 5 minutes, and a shorter term average BR, for example averaged over 30 seconds, and use both measurements to control the rate of production of bits by the parallel transcode system. If an average BR differs from a target average BR, the transcode manager 123 may adjust a nominal QP for one or more transcoder devices 134a-n to direct the average BR towards the target average BR. To this end, the transcode manager 123 directs the BR towards a target average BR while slowly varying the QP 159 to achieve a relatively continuous QP at the boundaries of the output segments.

In other embodiments, the transcode manager 123 specifies a video quality level for each of the encoders 158 in order to achieve a relatively constant subjective video quality between output segments throughout a parallel encoding process. In this case, each encoder 158 may encode a respective output segment according to any QP 159 as long as the encoder 158 achieves approximately the specified video quality level. If the transcode manager 123 determines that the average BR of the bit stream should be adjusted in order to meet a target average BR, then the transcode manager 123 may adjust the video quality level. The transcode manager 123 may instruct at least a portion of the encoders 158 to comply with the adjusted video quality level. In response to this instruction, an encoder 158 may adjust the QP 159 or adjust any other encoder parameter to account for the modified target video quality level. To this end, the transcode manager 123 monitors an average BR of the bit stream and adjusts the video quality parameter to ensure that the average BR for the bit stream falls within an acceptable range of a target average BR.

Figure 2:
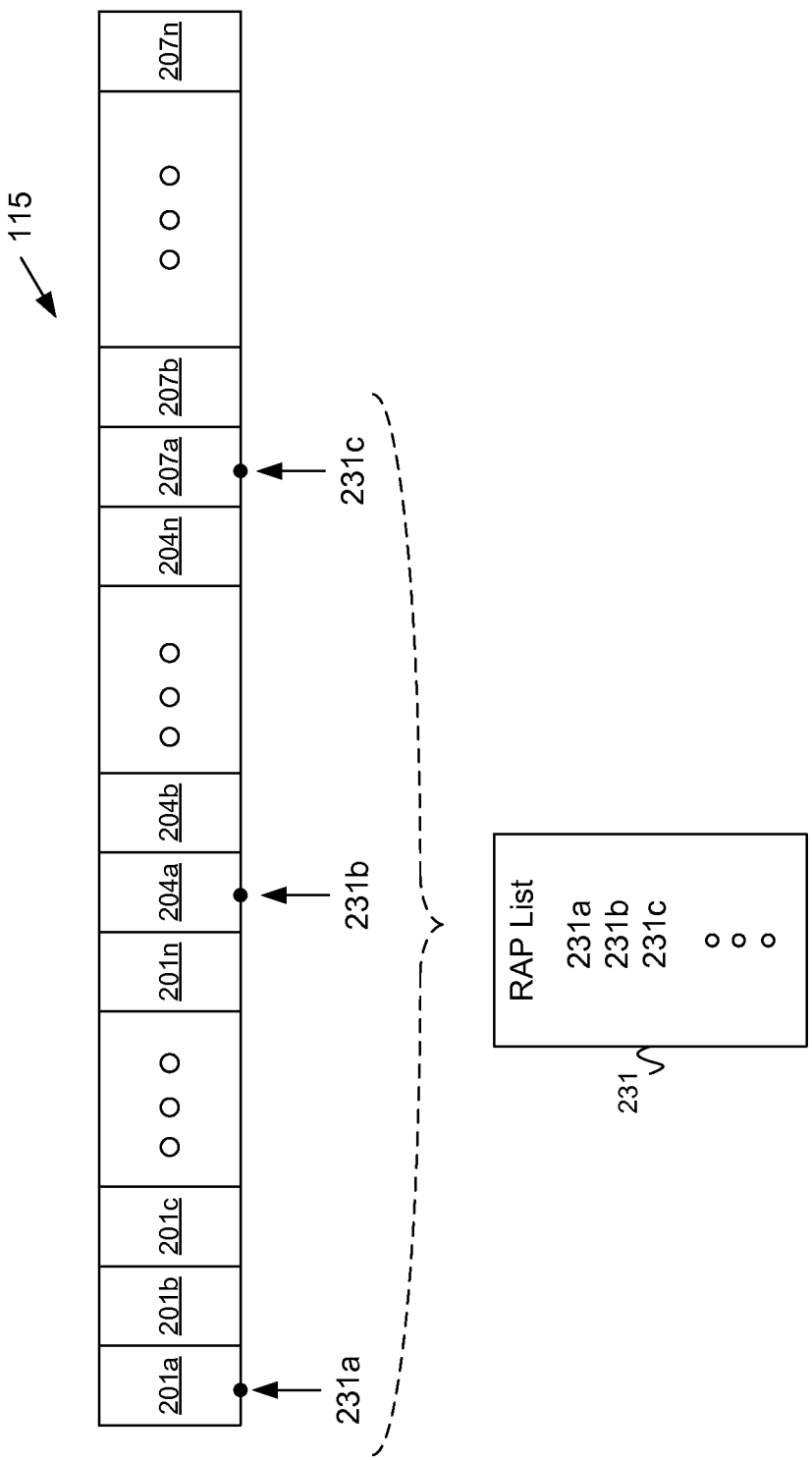
FIG. 2 is a diagram of an example of an input media file within the transcoding system of FIG. 1, in accordance with various embodiments.

Next, in FIG. 2 shown is a diagram of an example of an input media file 115 within the transcoding system 100 of FIG. 1, in accordance with various embodiments. FIG. 2 depicts an input media file 115 expressed in terms of a series of pictures that may ultimately be ordered according to an order of presentation. The order of the pictures in the bit stream may differ from the order that the pictures are meant to be presented, which may be the case for particular video compression standards. The input media file 115 may also be expressed in terms of a bit stream. In this respect, a series of bits make up an individual picture.

The input media file 115 comprises a plurality of pictures 201a-n, 204a-n, 207a-n. The input media file 115 also comprises random access points (RAPs) 231a-231c. Each RAP 231a-c is a picture with characteristics that enable decoding starting from the RAP 231a-c. A RAP list 231 identifies RAPs that exist in the input bit stream of the input media file 115.

In various embodiments, the RAP list 231 may be obtained from a process that indicates the locations of RAPs 231a-c in a stream as the stream is being received and stored in an input media file 115. In alternative embodiments, the RAP list 231 may be obtained by the transcoding system 100 (FIG. 1) that processes the input media file 115. For example, the transcode manager 123 (FIG. 1) may be configured to parse the bit stream of the input media file 115 and identify a set of RAPs 231a-c. Regardless of how the RAP list 231 is ascertained, the transcode manager 123 may use the RAP list 231 to divide the input media file 115 into segments to facilitate parallel transcoding.

In various embodiments, a RAP 231a-c is an I-picture (intra-coded picture). An I-picture is a fully specified picture that does not require other pictures for decoding. That is to say, I-pictures are independent pictures. Referring to FIG. 2, a first set of pictures 201a-n begins with a first RAP 231a, a second set of pictures 204a-n begins with a second RAP 231b, and a third set of pictures 207a-n begins with a third RAP 231c. A RAP may be any picture that has characteristics that enables a decoding starting from that picture.

In various embodiments, each set of pictures 201a-n, 204a-n, 207a-n may comprise a respective last picture 201n, 204n, 207n, where the respective last picture is a P-picture (predicted picture) or a B-picture (Bi-predicted picture). P-pictures and B-pictures are partially specified pictures that require other pictures for decoding.

Figure 3:
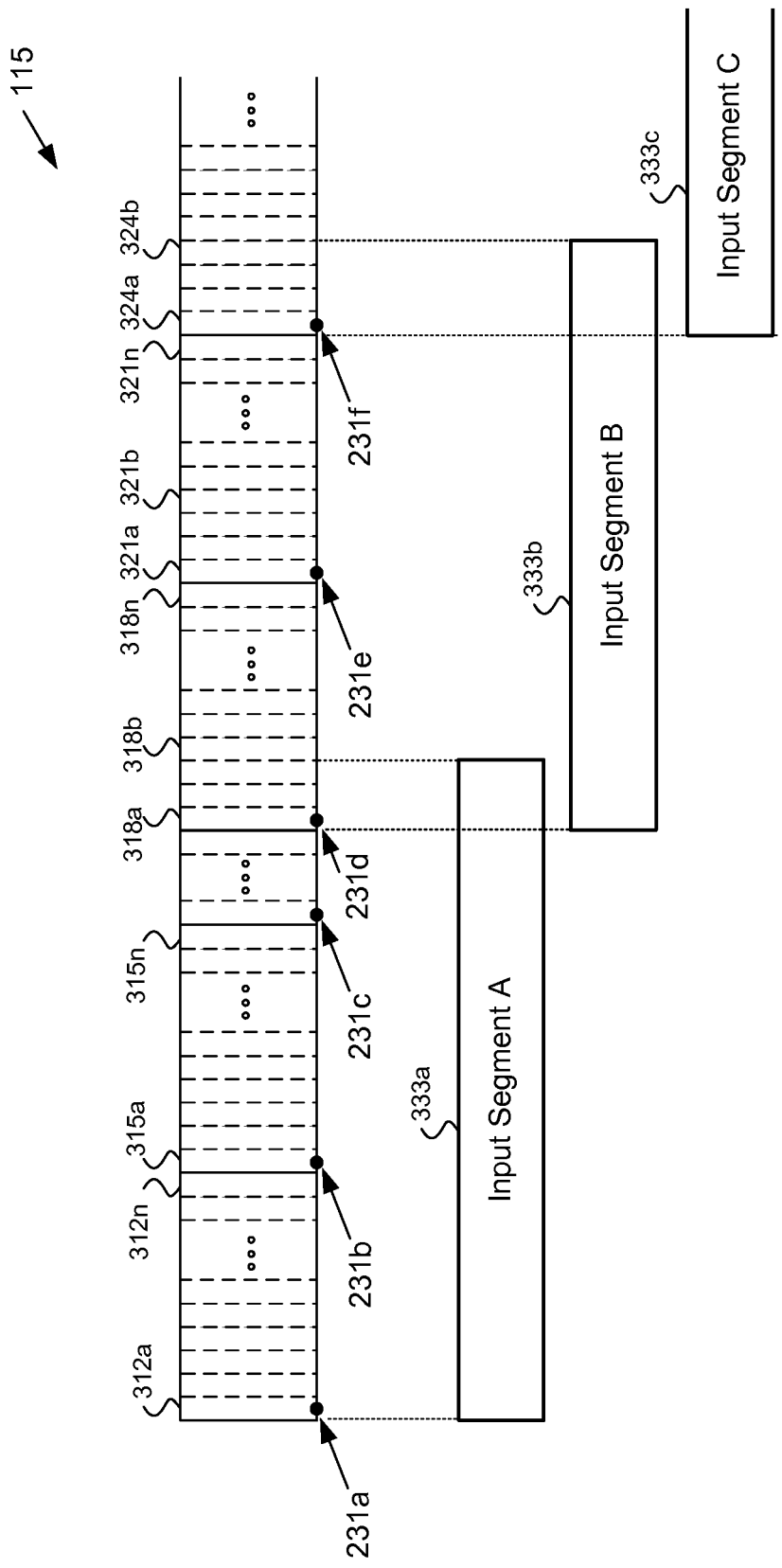
FIG. 3 is a diagram of an example of an input media file within the transcoding system of FIG. 1, in accordance with various embodiments.

Turning to FIG. 3, shown is a diagram of an example of an input media file 115 within the transcoding system of FIG. 1, in accordance with various embodiments. FIG. 3 depicts an input media file 115 expressed in terms of a sequence of pictures ordered according to presentation. The input media file 115 comprises a plurality of RAPs 231a-f. The input media file also comprises a first set of pictures 312a-n, a second set of pictures 315a-n, a third set of pictures 318a-n, a fourth set of pictures 321a-n, and/or any additional subsequent sets of pictures. In addition, FIG. 3 provides a non-limiting example of dividing the input media file 115 into a plurality of input segments 333a-c.

The transcode manager 123 (FIG. 1) may analyze the input media file 115 and determine a RAP list 231 (FIG. 2) for the input media file 115. Based on the location of the RAPs 231a-f, the transcode manager 123 may identify a starting point for each input segment. Each input segment 333a-c begins on a RAP 231a, 231d, 231f. For example, the first RAP 231a of the input media file 115 may indicate to the transcode manager 123 the generation of the starting point for the first input segment 333a.

The transcode manager 123 may be configured to generate each input segment 333a-c according to an optimal length. The length of an input segment 333a-c may be expressed in terms of a number of pictures, an amount of time, a number of bits, a number of RAPs encompassed by the input segment 333a-c, etc. Although each input segment 333a-c is not necessarily identically equal to other input segments 333a-c in terms of length, each input segment 333a-c may be approximately equal in length to other input segments 333a-c.

The transcode manager 123 divides the input media file 115 into input segments to effectuate parallel processing of the input media file 115. When input segments 333a-c are too long, the start-up costs to realize the benefits of parallel processing may be high. For example, if an input media file 115 is divided into four input segments 333c, where each segment is approximately a quarter in terms of length, then the benefits of parallel processing is not realized for the first quarter of the transcoding process.

When input segments are too short, the efficiency of a parallel transcoding system may be reduced due to overhead. The use of short segments may also increase the visibility or audibility of certain audio/visual artifacts/abnormalities in the output stream. For example, by separating an input media file 115 into short segments, and stitching the short transcoded segments together, the number of stitches increases and this may increase the occurrence of discontinuous values of some parameters in the transcoded output.

In various embodiments, the input segment length is approximately 10 seconds. According to this target length, the transcode manager 123 may find an end picture 318b, 324b for each input segment 333a-c. For example, the transcode manager 123 may identify the nearest RAP 231d, f that is 10 seconds beyond a respective starting picture 312a, 318a, 324a, for each input segment 333a-c. Based upon the nearest RAP 231d, f, the transcode manager 123 may add a predetermined length beyond the nearest RAP 231d, f in order to determine an ending picture for each input segment 333a-c.

For example, the end picture of Input Segment A 333a may include a number of additional pictures 318a-b beyond the starting picture of Input Segment B 333b in order to provide an overlap for use in processing by a processor 156 (FIG. 1), as is described in further detail below.

In other embodiments, a transcoder device 134a-n (FIG. 1) is configured to indicate to the transcode manager 123 to stop feeding an input segment 333a-c when the transcoder device 134a-n has completed or is nearing completion of the transcoding process. Moreover, additional data beyond the ending picture that is fed to the transcoder device 134a-n may be dropped by the transcoder device 134a-n. To this end, the transcoder device 134a-n may determine the ending picture of an input segment 333a-c.

In the non-limiting example of FIG. 3, the transcode manager 123 identifies a starting picture 312a for the first input segment 333a. The transcode manager 123 identifies a subsequent RAP 231d that is approximately 10 seconds after the starting picture 312a in terms of presentation time. The transcode manager 123 and/or transcoder device 134a-n adds a predetermined length beyond the subsequent RAP 231d to identify the end picture 318b for the first input segment 333a. In this non-limiting example, the predetermined length is four pictures. Thus, the first input segment 333a encompasses a plurality of RAPs 231b, 231c in addition to the subsequent RAP 231d.

To identify the next input segment 333b, the transcode manager 123 sets the starting picture of the next input segment 333b as the last RAP 231d of the previous input segment 333a. This leads to an overlap between each input segment 333a-d. The overlap length is equal to the predetermined length. The predetermined length may be expressed in terms of a number of pictures, a time, a number of bits, etc.

By extending the end picture 318b, 324b to a predetermined length past a subsequent RAP 231d, f respectively, to create an overlap amount, a transcoder device 134a-n (FIG. 1) that transcodes an input segment 333a-d has additional information to adequately decode the last few pictures in an input segment 333a-c. For example, when decoding a target picture, multiple pictures that extend beyond the target picture in the bit stream may be needed. For example, with reference to the non-limiting example of FIG. 3, decoding a target picture 321n of input segment B 333b may require at least a portion of subsequent pictures 324a-b. By including these subsequent pictures 324a-c as part of input segment B 333b, it is ensured that the target picture 321n is adequately decoded.

In various embodiments, the transcode manager 123 may select a predetermined length based at least upon the processing functions to be performed by the transcoder devices 134a-n. For example, de-interlacing operations may require using a larger predetermined length than image enhancement operations.

Figure 4:
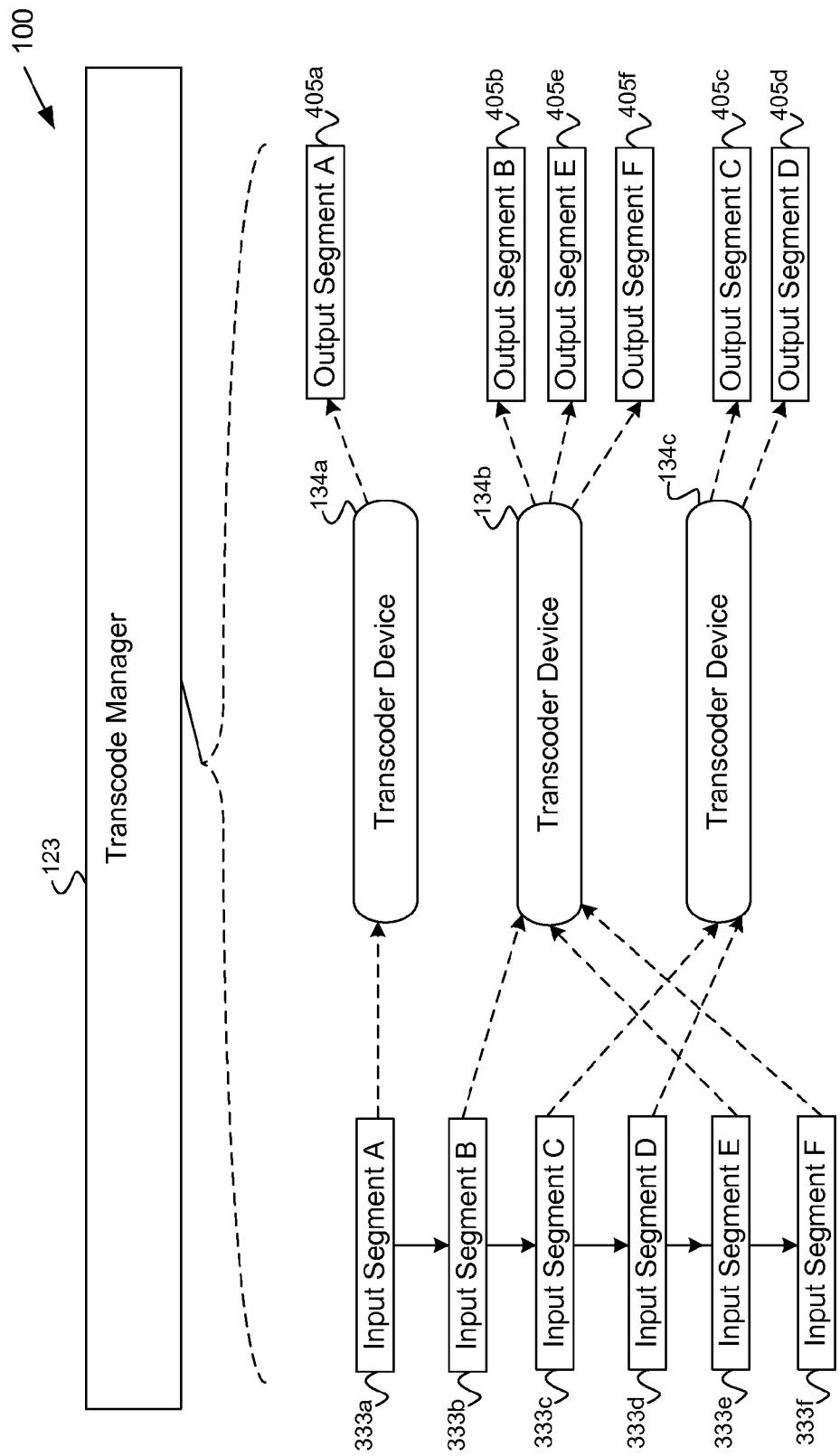
FIG. 4 is a diagram of an example of the operation of a transcode manager implemented within the transcoding system of FIG. 1, in accordance with various embodiments of the present disclosure.

Referring next to FIG. 4, shown is an example of the operation of a transcode manager 123 implemented within the transcoding system 100 of FIG. 1, in accordance with various embodiments of the present disclosure. FIG. 4 provides a non-limiting example of a transcode manager 123 that allocates a plurality of input segments 333a-f to various transcoder processes. These transcoder processes may operate concurrently for transcoding the input segments 333a-f in parallel. For example, the transcode manager 123 may allocate the input segments 333a-f to transcoder processes in three transcoder devices 134a-c. Each transcoder device 134a-c is configured to transcode received input segments 333a-f and generate corresponding output segments 405a-f.

The input segments 333a-f may be arranged in an order of presentation. That is to say, a user who plays back the media file observes the input segments 333a-f arranged in a chronologic sequence according to the presentation order. As the input segments 333a-f are transcoded in parallel by the transcoder devices 134a-c, an order of transcoding may occur such that the outputs of the transcoder devices 134a-c may need to be re-sequenced to maintain the original order of presentation. In this respect, the transcoding order may vary from the presentation order.

In the transcoding system 100 of FIG. 4, each transcoder device 134a-c may be characterized by varying transcoding speeds. For example, the first transcoder device 134a may be an inherently slower transcoder device than the second transcoder device 134b. In this case, a physical implementation of each transcoder device 134a-c may affect transcoding speeds and vary transcoding processing resources for each transcoder device 134a-c.

In addition, each input segment 333a-f may vary in terms of the number of pictures in each input segment or the complexity of the pictures in each input segment. For example, input segment A 333a may comprise a larger number of pictures than input segment C 333c. Thus, transcoding input segment A 333a may require substantially more time than transcoding input segment C 333c. For another example, input segment A 333a may comprise a series of pictures characterized by complex color patterns, motion, and/or movement. Input segment C 333c may comprise a series of monotone pictures with little to no motion or movement. Thus, transcoding input segment A 333a may require substantially more time than transcoding input segment C 333c.

When allocating input segments 333a-f to transcoder devices 134a-c, the transcode manager 123 may determine allocation by analyzing a workload queue of each transcoder device 134a-c. In various embodiments, each transcoder device 134a-c tracks the number of input segments 333a-f scheduled for transcoding. Each transcoder device 134a-c may maintain a counter to count the number of scheduled input segments 333a-f in a work queue. In another example, each transcoder device 134a-c provides an indication when it has completed transcoding each input segment. In other embodiments, each transcoder device 134a-c quantifies a progress status that correlates with the work load of the transcoder device 134a-c. For example, each transcoder device 134a-c may provide an estimated time of completion for the work scheduled in the work queue. The transcode manager 123 may track the work progress of each transcoder device 134a-c and allocate subsequent input segments 333a-f accordingly.

In the non-limiting example of FIG. 4, the transcode manager 123 sends input segment A 333a to the first transcoder device 134a, input segment B 333b to the second transcoder device 134b, and input segment C 333c to the third transcoder device 134c. At this point, each transcoder device 134a-c is presently transcoding a respective input segment 333a-c such that the work queue for each transcoder device 134a-c is populated. Moreover, each transcoder device 134a-c is transcoding the respective input segments 333a-c to generate corresponding output segments 405a-c, respectively.

The next sequential input segment, input segment D 333d, is to be allocated by the transcode manager 123. In various embodiments, the transcode manager 123 considers the transcoding progress of each transcoder device 134a-c. The transcode manager 123 may allocate input segment D 333d to the transcoder device 134a-c that could begin processing input segment D 333d at the earliest point in time. Assuming that the first transcoder device 134a and the second transcoder device 134b have later estimated times of completion than the third transcoder device 134c, the transcode manager 123 may allocate input segment D 333d to the third transcoder device 134c.

The transcode manager 123 may continue allocating input segments 333a-f based on the progress status of each transcoder device. Each transcoder device 134a generates corresponding output segments 405a-f. It may be the case that the output segments 405a-f are generated in an order that differs from the presentation order of the input segments 333a-f.

In various embodiments, the transcode manager 123 is configured to grant other transcoding systems 100 (FIG. 1) access to one or more transcoder devices 134a-c. For example, a first transcoding system 100 may share one or more transcoder devices 134a-c with another transcoding system 100. Each transcoding system 100 may be implemented as a portion of a respective STB or another computing device. In this respect, a network of STBs may be configured to share its transcoder devices 134a-c with other STBs. Alternatively, one STB may be configured to perform a plurality of transcode operations on a plurality of input files or streams concurrently. The transcode manager 123 may allow or deny access to transcoder devices 134a-c managed by the transcode manager 123. Similarly, a transcode manager 123 may request to use one or more transcoder devices 134a-c of another transcoding system 100. In this case, a set of transcoding systems 100 may be networked to facilitate resource sharing of respective transcoder devices 134a-c.

Figure 5:
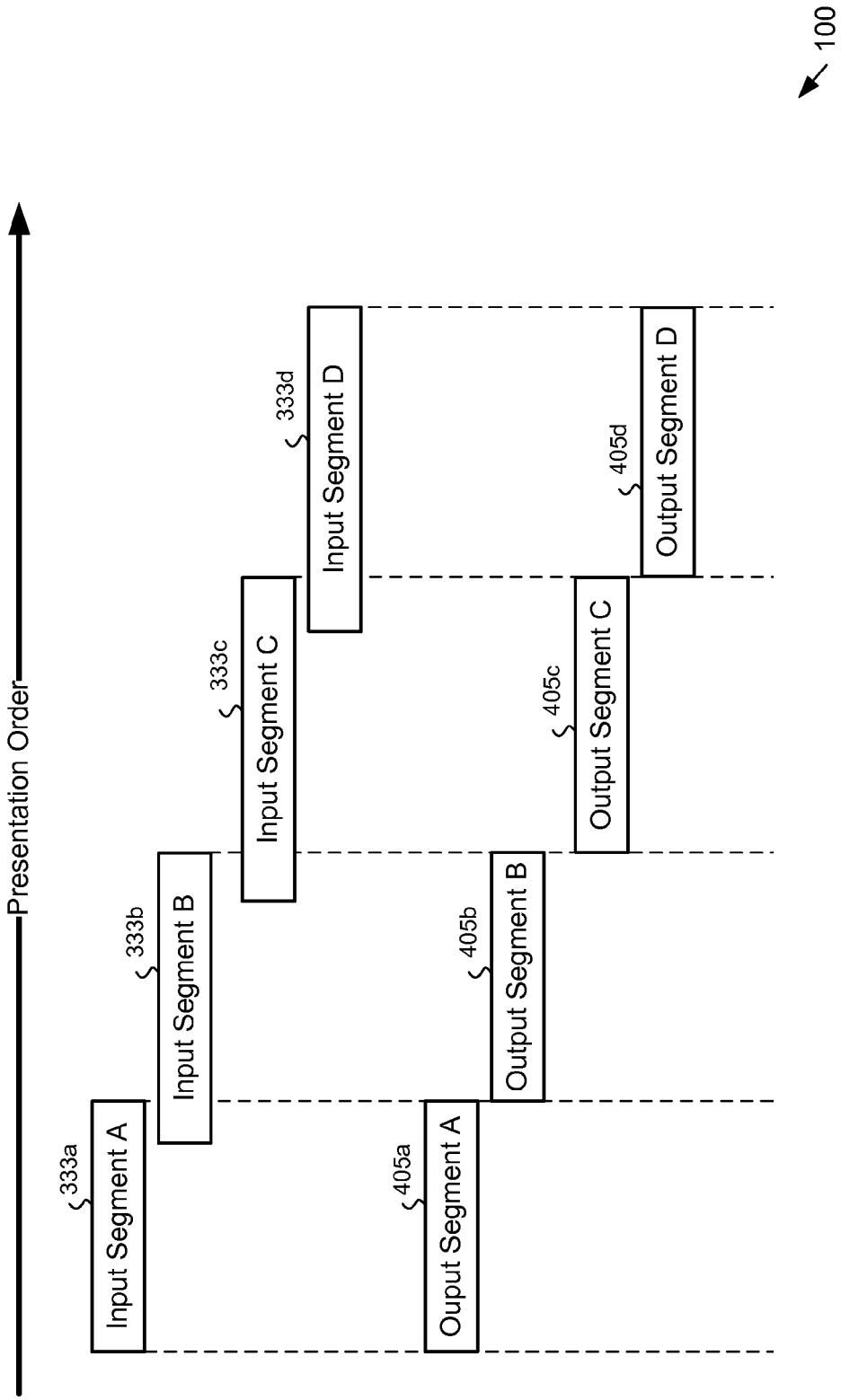
FIG. 5 is a diagram of an example of the operation of the transcoding system of FIG. 1, in accordance with various embodiments of the present disclosure.

Moving to FIG. 5, shown is a diagram of the operation of the transcoding system 100 of FIG. 1, in accordance with various embodiments of the present disclosure. FIG. 5 provides a non-limiting example of sequential input segments 333a-d and corresponding output segments 405a-d arranged in presentation order. In various embodiments, the output segments 405a-d are configured to form a series of contiguous output segments such that each output segment 405a-d does not overlap with an adjacent output segment 405a-d in the series of output segments.

Input segments 333a-d represent sequential, overlapping time ranges of an input media file 115 (FIG. 1). Thus, each input segment 333a-d may be characterized by a start time and a stop time in terms of presentation time. That is to say, each input segment 333a covers a time range or window of the media item expressed by the input media file 115. For example, assuming the media item is a movie, input segment A 333a covers 0 seconds to 10.5 seconds of the movie and input segment B covers 10.4 seconds to 20.2 seconds of the movie.

Each input segment 333a-d is sent to a respective transcoder device 134a-n (FIG. 1). A transcoder device 134a-n that receives an input segment 333a-d transcodes the received input segment 333a-d and generates a corresponding output segment 405a-d. Each output segment 405a-d is also characterized by a range of presentation time with a start time and a stop time. For example, following the example of the previous paragraph, output segment A 405a, which is a transcoded version of input segment A 333a, covers 0 seconds to 10.5 seconds of the transcoded movie. Output segment B 405b, which is a transcoded version of input segment B 333b, covers 10.5 seconds to 20.2 seconds of the transcoded movie.

As seen in the non-limiting example of FIG. 5, the output segments 405a-d of corresponding input segments 333a-d are sequential, contiguous, and non-overlapping. For example, the last picture of output segment A 405a immediately precedes the first picture of output segment B 405b. In this respect, the output segments 405a-d form a continuous series of segments that may be assembled to generate a transcoded output media file 121 (FIG. 1).

Each output segment 405a-d covers the same time range of the corresponding input segment 333a-d or covers a subset of the time range of the corresponding input segment 333a-d. For example, the time range for output segment A 405a is 0 seconds to 10.5 seconds, which is the same time range of input segment A 333a. However, the time range for output segment B 405b is 10.5 seconds to 20.2 seconds, which is a subset of the time range of input segment B 333b, which is 10.4 seconds to 20.2 seconds. Thus, the processor 156 (FIG. 1) of a transcoder device 134a-d receives a decoded input segment of a particular window of presentation time and generates a corresponding output segment that is associated with a subset of the window of presentation time of the input segment. This allows for the processor 156 to achieve the benefits of serial transcoding while actually implementing parallel transcoding.

For example, the processor 156 may perform a de-interlacing operation to generate an output segment associated with a particular window of presentation time. To generate the output segment, the input to the de-interlacing operation should be associated with an input window that is large enough to result in a sufficient de-interlacing operation to generate the output segment associated with the particular window of presentation time. In the non-limiting example of FIG. 5, output segment B 405b is associated with a window of 10.5 seconds to 20.2 seconds. The de-interlacing operation used to generate the output segment B 405 may need an input segment associated with a window that spans the range of at least 10.4 seconds to 20.2 seconds. Put another way, to de-interlace decoded pictures associated with the range of 10.5 seconds to 20.2 seconds, the de-interlacing operation may require utilizing decoded pictures that precede 10.5 seconds.

In various embodiments, the first input segment 333a of an input media file 115 covers the same time range as the corresponding output segment 405a. After the first output segment 405a, subsequent output segments are associated with respective time ranges that are subsets of corresponding input segment time ranges.

Figure 6:
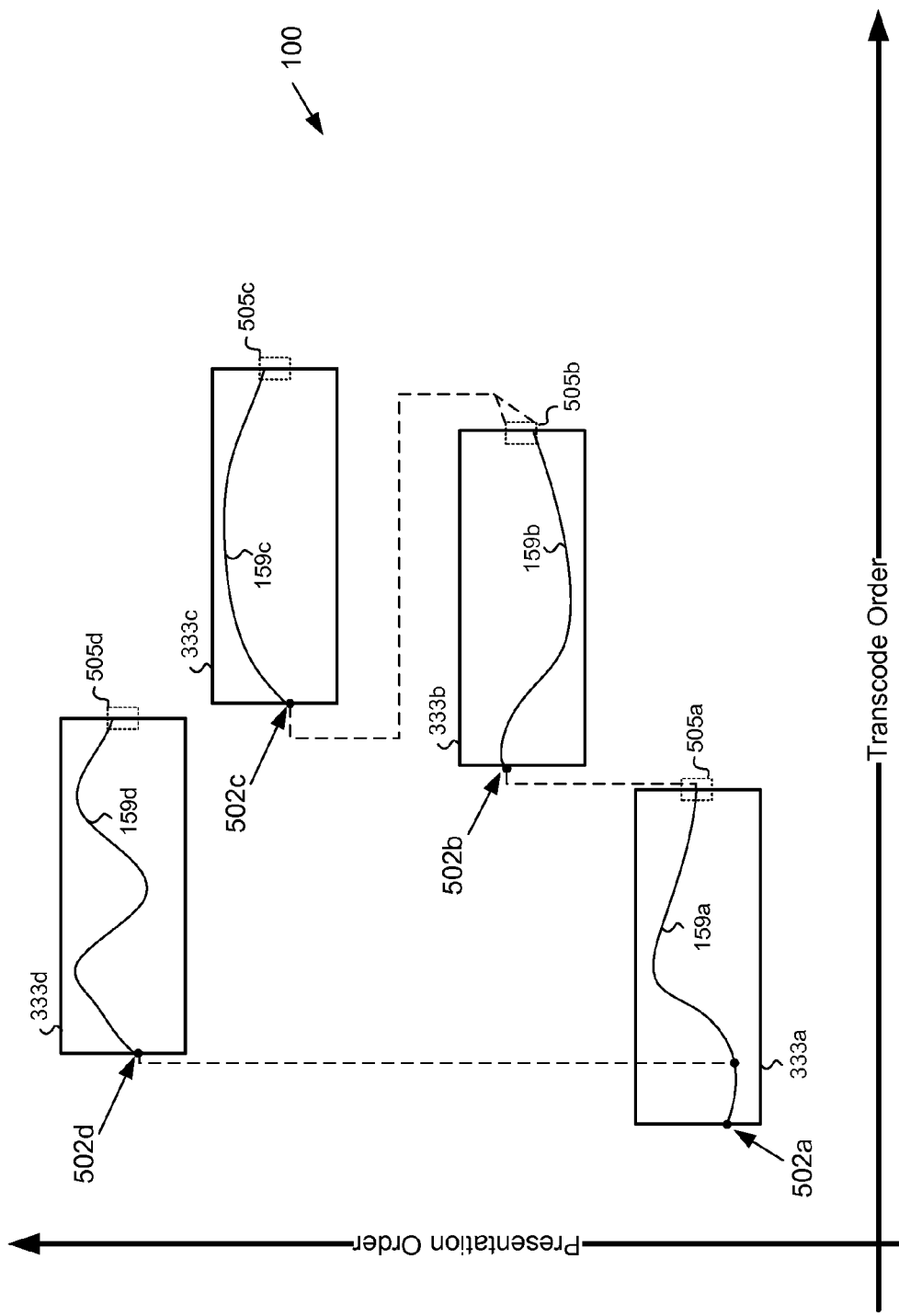
FIG. 6 is a diagram of an example of the operation of the transcoding system of FIG. 1, in accordance with various embodiments of the present disclosure.

Turning now to FIG. 6, shown is an example of the operation of the transcoding system 100 of FIG. 1, in accordance with various embodiments of the present disclosure. FIG. 6 provides a non-limiting example of transcoding four input segments 333a-d using parallel transcoder devices 134a-n (FIG. 1), where each input segment 333a-d is allocated by a transcode manager 123 (FIG. 1) to a respective transcoder device 134a-n.

Each input segment 333a-d is arranged along a y-axis in terms of presentation order. Input segment A 333a is first to be presented, input segment B 333b is immediately next, input segment C 333c immediately follows input segment B 333b, and input segment D 333d immediately follows input segment C 333c. The lower the input segment 333a-d is depicted along the y-axis, the earlier the input segment 333a-d is to be presented.

Each input segment 333a-d is also arranged along an x-axis in terms of transcode order. Input segments 333a-d that are closer to the left on the x-axis indicate that the input segment 333a-d is transcoded at an earlier point in time. Thus, input segment A 333a is the first input segment to be transcoded, followed by input segment D 333d, followed by input segment B 333b, followed by input segment C 333c. The staggered transcoding order may result from the parallel transcoder devices 134a-n processing input segments 333a-d at varying points in time. It may be inferred from the example of FIG. 6, that the transcoder device 134a-n that is designated to transcode input segment A 333a is not the same transcoder device 134a-n that is designated to transcode input segment D 333d. This inference is based on the fact that input segment A 333a and input segment D 333d have overlapping transcode times, and the assumption that a transcoder device 134a-n may process an input segment 333a-d one at a time. However, it may be inferred that the transcoder device 134a-n that is designated to transcode input segment A 333a could also be the same transcoder device 134a-n that is designated to transcode input segment B 333b or input segment C 333c. This is due to the fact that the transcode time of input segment A 333a neither overlaps with input segment B 333b nor input segment C 333c. However, a transcoder device 134a-n may be able to process more than one input segment 333a-d concurrently. The set of pictures of an input segment 333a-c that are encoded by a transcoder may be referred to as an output segment. The encoded version of this same set of pictures may also be referred to as an output segment.

FIG. 6 also provides a non-limiting example of the dynamic adjustment of the QP 159a-d of each encoder 158 (FIG. 1) implemented in a corresponding transcoder device 134a-n. For example, the QP 159a associated with the encoding of input segment A 333a may be dynamically adjusted through the encoding process implemented by the transcoder device 134a-n responsible for transcoding input segment A 333a. To this end, the encoding of each input segment 333a-d comprises a corresponding QP 159a-d that may be adjusted through the course of encoding. When encoding a particular input segment 333a-d, the QP 159a-d may be initialized to initial QP values 502a-d. Additionally, the transcode manager 123 may direct each transcode process to process its respective QP 159a-d in such a way that it converges to a predetermined QP range 505a-d, as is discussed in further detail below.

In various embodiments, a transcode manager 123 is configured to manage the QP 159a-d for each transcoder process as the transcoder devices 134a-n process various series of input segments 333a-d. The encoder 158 of a transcoder device 134a-n may adjust the QP 159a-d as it performs the encoding process. Accordingly, each input segment 333a-d is associated an output segment 405a-d. Each output segment 405a-d is associated with an initial QP 502a-d and a final QP, where the QP is used by each transcoder process to produce a corresponding encoded output segment 405a-d. When the final QP of a particular output segment 405a-d significantly varies from the initial QP 502a-d of the next output segment 405a-d to be presented, a disjointed QP transition occurs. Disjointed QP transitions may lead to visual artifacts between the output segments 405a-d that correspond to transcoded input segments 333a-d. Thus, the transcode manager 123 may be configured to influence the QP 159a-d of each output segment 405a-d being encoded to generate a relatively continuous QP 159 across a series of sequential output segments 405a-d such that there is a relatively small difference in QP 159 from one encoded output segment to the next.

In one embodiment among others, the transcode manager 123 obtains the final QP value of a completely encoded output segment 405a-d and uses this final QP value to set the initial QP 502a-d of the next output segment 405a-d in presentation order. For example, the final QP of output segment A 405a may be used to initialize the initial QP 502 of output segment B 405b. In this case, the transcoder device 134a-n that is responsible for processing input segment A 333a communicates or otherwise reports the final QP associated with output segment A 405a to the transcode manager 123. The transcode manager 123 may then control the transcoder device 134a-n that is responsible for processing input segment B 333b by setting the initial QP 502b.

However, it may be the case that an input segment 333b is being concurrently transcoded along with the next input segment 333c to be presented. For example, by the time input segment B 333b completes the transcoding process, input segment C 333c has already begun the transcoding process. To address this case, various embodiments relate to directing the QP 159b to converge approximately within a predetermined QP range 505b. For example, as the transcode manager 123 monitors the encoding of output segment B 405B associated with input segment B 333b, the transcode manager 123 may set a predetermined QP range 505b to instruct or otherwise direct the QP 159b to converge within the predetermined QP range 505b. The transcode manager 123 may then initialize the QP 159c of output segment C 405c by setting the initial QP 502 of output segment C 405c based at least upon the predetermined QP range 505b of output segment B 405b. In another embodiment the transcode manager 123 determines initial values of QP 159b and 159c of output segments 405b and 405c respectively. The transcode manager 123 may determine a predetermined QP range 505b based on the initial value of QP 159c of output segment 405c, and instruct or otherwise direct the QP 159b to converge, in general, within the predetermined QP range 505b. This may reduce the risk of a disjointed QP between output segment B 405b and output segment C 405c, thereby resulting in high visual quality of the resulting output file (stream).

In various embodiments, the predetermined QP range 505a-d may be adjusted dynamically based at least in part upon the encoding process applied to output segments 405a-d. For example, during the encoding process, a QP 159a-d may be reported by the encoder 158 to the transcode manager 123 and based on this QP 159a-d, the transcode manager 123 may dynamically adjust the predetermined QP range 505a-d for those output segments 405a-d that are scheduled to be encoded. In alternative embodiments, the predetermined QP range 505a-d may not depend on the QP values 159a-d utilized by encoders 158. In this respect each encoder is committed to the same predetermined QP range 505a-d. In another alternative embodiment, the predetermined QP range 505a-d may be approximately equal for all encoders encoding output segments 405a-d, and the predetermined QP range 505a-d may vary over time. Alternatively, the transcode manager 123 may determine a QP or QP range independently for each output segment 405a-d and for each encoder. These QPs or QP ranges may differ between segments and between encoders. The transcode manager 123 may determine the QP or QP ranges based at least in part upon the measured or actual BR produced by the encoders and the target average bit rate. Alternatively, the transcode manager 123 may determine a QP or QP range based at least in part upon attributes of the input stream. Non-limiting examples of attributes of the input stream include numbers of bits representing pictures or sets of picture, QP values, scene changes, motion vectors, or characteristics of pictures.

It may also be the case that an input segment 333d associated with a later presentation time is encoded before an input segment 333b, c associated with an earlier presentation time. For example, input segment D 333d begins the encoding process before the encoding of input segments B and C 333b, c. Various embodiments of the present disclosure are directed to obtaining an instant QP 159a-d of an output segment 405a-d that is presently being encoded and using the instant QP 159a-d to initialize the initial QP 502a-d of another output segment 405a-d. For example, the transcode manager 123 may obtain an instant QP of output segment A 405a while output segment A is presently being encoded and base an initial QP 502d for output segment D 405d on the instant QP. Thus, the transcoding system 100 allows a transcode manager 123 to read QP 159a-d from transcoder devices 134a-d.

Figure 7:
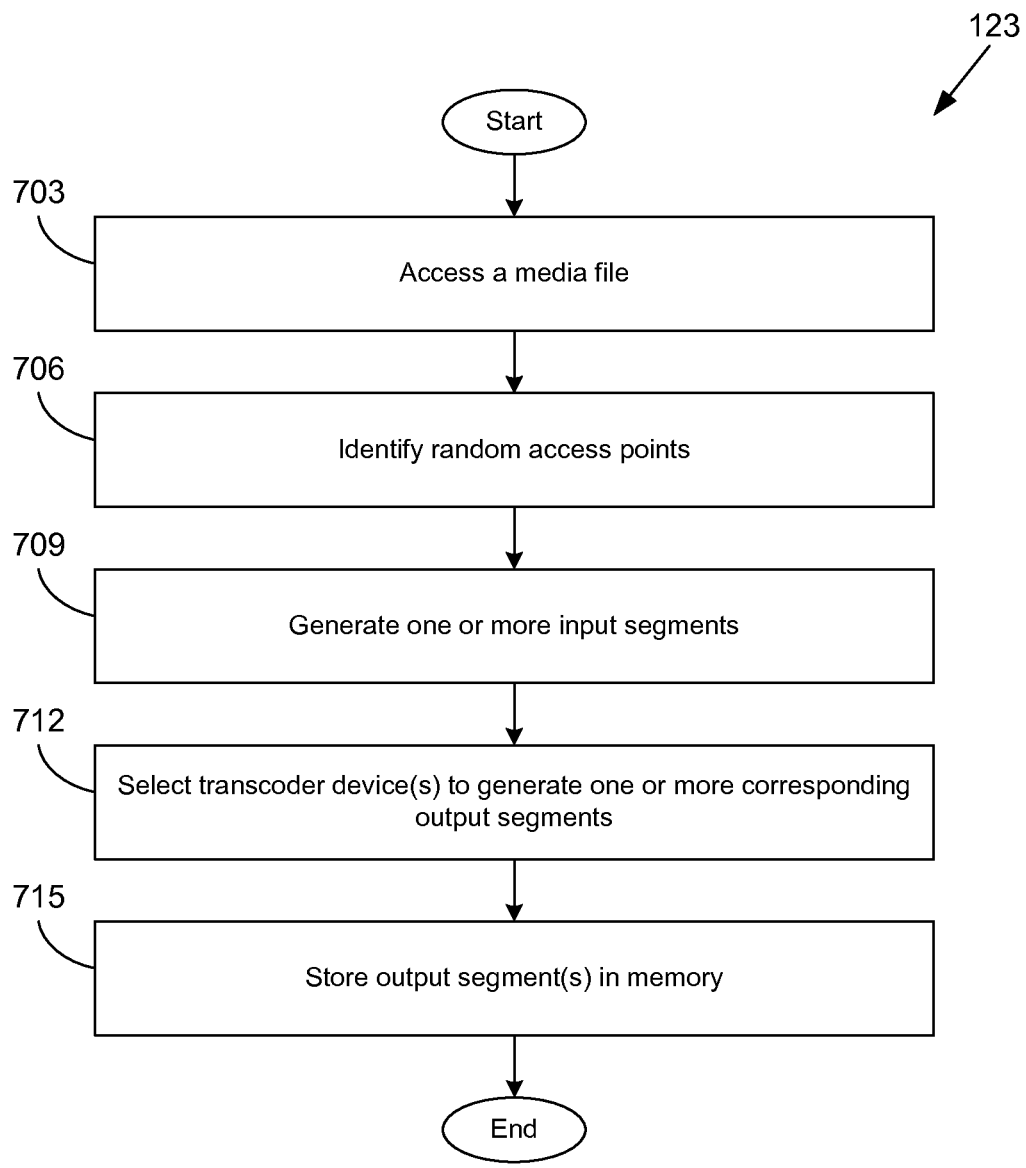
FIG. 7 is a flowchart illustrating an example of functionality implemented as portions of the transcode manager of FIG. 1, in accordance with various embodiments of the present disclosure.

Referring next to FIG. 7, shown is a flowchart illustrating examples of functionality implemented as portions of the transcode manager 123 of FIG. 1, in accordance with various embodiments of the present disclosure. It is understood that the flowchart of FIG. 7 provides merely an example of the many different types of functional arrangements that may be employed to implement the operation of the transcode manager 123 as described herein. As an alternative, the flowchart of FIG. 7 may be viewed as depicting an example of steps of a method implemented in the transcode manager 123 according to one or more embodiments.

To begin, at reference number 703, the transcode manager 123 accesses an input media file 115 (FIG. 1). The transcode manager 123 is configured to read the input media file from a source memory storage 112 (FIG. 1). The input media file 115 may be read as a bit stream that expresses a series of pictures. At reference number 706, the transcode manager 123 identifies random access points (RAPs) 231a-c (FIG. 2). RAPs may be identified based on a RAP list 231 (FIG. 2). The RAP list 231 may be part of the metadata associated with the input media file 115. The RAP list 231 may also be calculated by the transcode manager 123. In this case, the transcode manager 123 analyzes the input media file 115 and identifies the locations of RAPs.

At reference number 709, the transcode manager 123 generates one or more input segments 333a-c (FIG. 3). Input segments 333a-c are generated based at least upon the location of the RAPs 231a-f (FIG. 3). Each input segment 333a-c may comprise a starting point, and an ending point. The starting point for each input segment 333a-c may be a respective RAP 231a-f in the RAP list 231. Furthermore, each input segment 333a-c may encompass a number of RAPs 231a-f. In various embodiments, the endpoint is a predetermined number of pictures beyond the last RAP 231a-f of a particular input segment 333a-c. A following input segment 333a-c may have a starting point of the last RAP 231a-f of the previous input segment 333a-c. In this respect, the series of input segments 333a-c are sequential, continuous, and overlapping.

At reference number 712, the transcode manager 123 selects one or more transcoder devices 134a-n (FIG. 1) to generate corresponding output segments 405a-f (FIG. 4). Each transcoder device 134a-n is configured to receive an input segment 333a-f (FIG. 4), transcode the input segment 333a-n, and generate a corresponding output segment 405a-f (FIG. 4). In various embodiments, output segments 405a-f obtained from the output of the transcoder devices 134a-f may be sequenced according to presentation order. When sequenced, output segments 405a-f are non-overlapping and contiguous. The transcode manager 123 may sequence the output segments 405a-f using a mux 143 (FIG. 1) and/or buffer memory. At reference number 715, the transcode manager 123 stores the output segments 405a-f in memory. For example, the output segments 405a-f may be sequenced, stitched together and stored as an output media file 121 (FIG. 1) in a destination memory storage 118 (FIG. 1). Stitching may involve concatenating each output segment 405a-f in presentation order.

Figure 8:
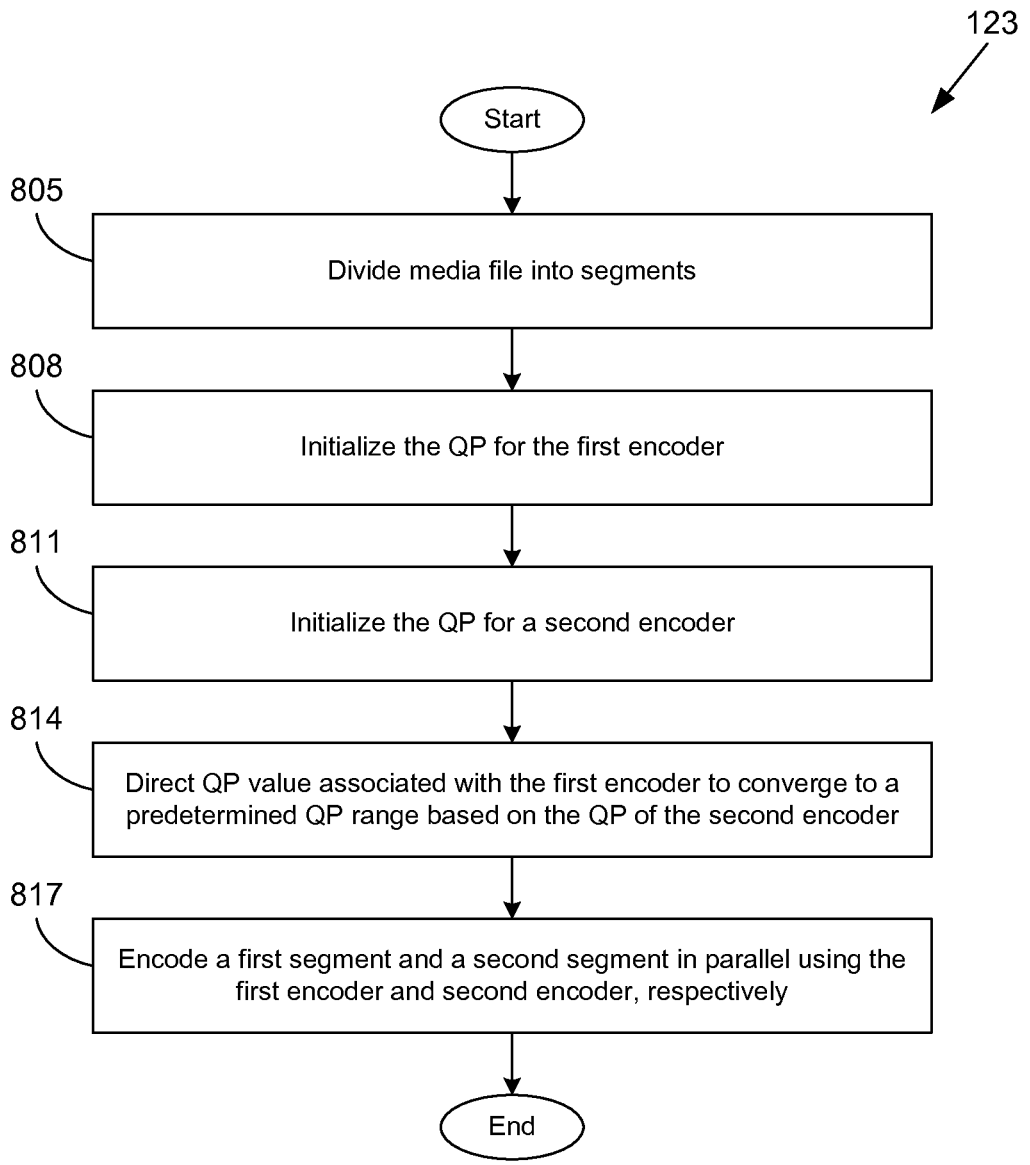
FIG. 8 is a flowchart illustrating an example of functionality implemented as another portion of the transcode manager of FIG. 1, in accordance with various embodiments of the present disclosure.

Referring next to FIG. 8, shown is a flowchart illustrating examples of functionality implemented as portions of the transcode manager 123 of FIG. 1, in accordance with various embodiments of the present disclosure. It is understood that the flowchart of FIG. 8 provides merely an example of the many different types of functional arrangements that may be employed to implement the operation of the transcode manager 123 as described herein. As an alternative, the flowchart of FIG. 8 may be viewed as depicting an example of steps of a method implemented in the transcode manager 123 according to one or more embodiments. Moreover, FIG. 8 provides a non-limiting example of functionality implemented in either a constant BR system or a variable BR system.

To begin, at reference number 805, the transcode manager 123 divides an input media file 115 (FIG. 1) into input segments 333a-c (FIG. 3). Input segments 333a-c may be generated based at least upon the location of RAPs 231a-f (FIG. 3). Each input segment 333a-c may comprise a starting point, and an ending point. The starting point for each input segment 333a-c may be a respective RAP 231a-f in the RAP list 231. Furthermore, each input segment 333a-c may encompass a number of RAPs 231a-f. In various embodiments, the endpoint is a predetermined number of pictures beyond the last RAP 231a-f of a particular input segment 333a-c. A following input segment 333a-c may have a starting point of the last RAP 231a-f of the previous input segment 333a-c. In this respect, the series of input segments 333a-c are sequential, continuous, and overlapping.

In various embodiments, the transcode manager 123 is configured to provide an input segment as a stream comprising a starting picture to a transcoder device 134a-n (FIG. 1). In this respect, the transcode manager 123 may initially specify a nominal value as an ending picture in the input segment 333a-c or alternatively not specify an ending picture. In this non-limiting example, the transcode manager 123 may stop feeding the input segment stream upon receiving an instruction from the transcoder device 134 to stop feeding the input segment 333a-c.

At reference number 808, the transcode manager 123 initializes the QP 159 (FIG. 1) of a first encoder 158 (FIG. 1). The transcode manager 123 may interface with a controller 149 (FIG. 1) of a transcoder to set the initial QP 502a-d (FIG. 6) of the encoder 158 of the transcoder. In various embodiments, the transcode manager 123 may set the initial QP 502a-d to a default value. At reference number 811, the transcode manager 123 initializes the QP 159 for the second encoder 158. The second encoder is scheduled to encode a second output segment 405a-d.

At reference number 814, the transcode manager 123 determines a predetermined QP range 505a-d based on the initial QP values 502a-d. The transcode manager instructs or otherwise directs the QP 159 of the first encoder 158 to predetermined QP range 505a-d. For example, the transcode manager 123 may use the controller 149 of the transcoder to set the predetermined QP range 505a-d of the encoder. By setting a predetermined QP range 505a-d, the encoder 158 that is scheduled to encode a first output segment 405a-d may guide the QP 159 to converge generally to a final QP within the predetermined QP range 505a-d. The predetermined QP range 505a-d may be a fixed range that is global to all transcoding processes or it may be calculated dynamically by the transcode manager 123. By directing the QP 159 associated with the first encoder 158 to converge to the predetermined QP range 505a-d, where the predetermined QP range 505a-d is based on an initial QP 502a-d for the second output segment 405a-d, the ending QP 159 of the first output segment 405a-d may be expected to approximately match the initial QP 502a-d of the second output segment 405a-d. To this end, the transcode manager 123 is configured to reduce the likelihood of disjointed QPs 159 occurring at the seams of output segments 405a-d (FIG. 4).

At reference number 817, the transcode manager 123 manages the encoding of the first output segment 405a-d and the second output segment 405a-d, where the encoding of the first output segment 405a-d and the second output segment 405a-d are performed in parallel by the first encoder 158 and the second encoder 158, respectively.

Figure 9A:
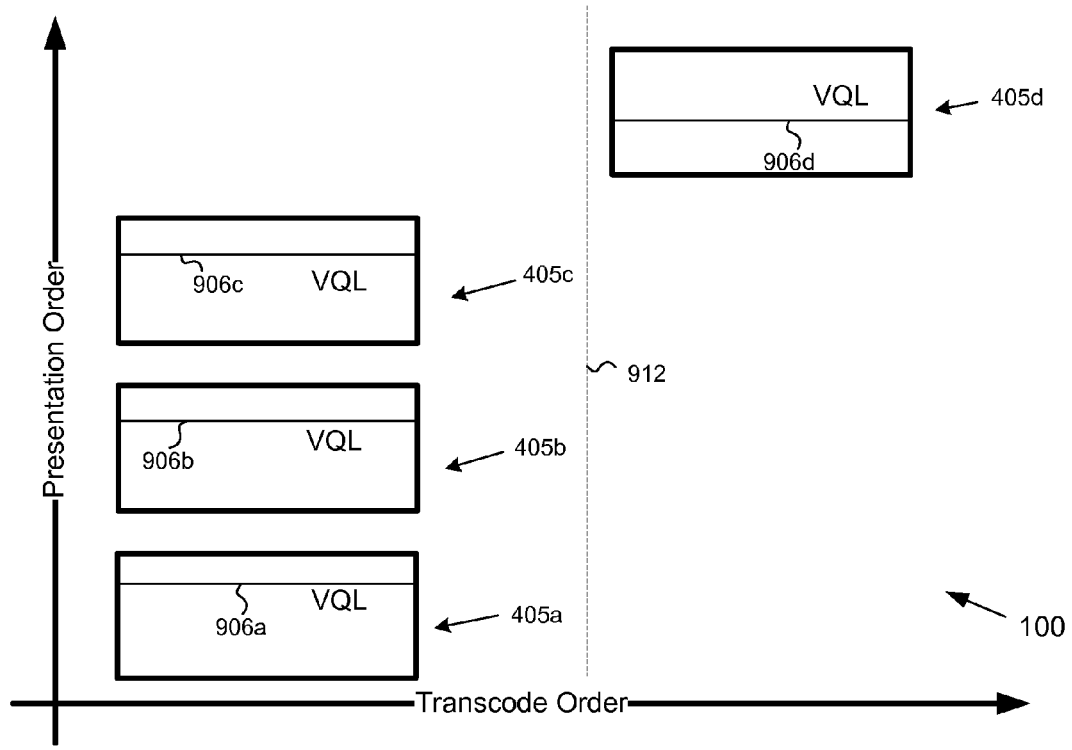
FIGS. 9A and 9B are diagrams of examples of the operation of the transcoding system of FIG. 1, in accordance with various embodiments of the present disclosure.

Turning now to FIG. 9A, shown is an example of the operation of the transcoding system 100 of FIG. 1, in accordance with various embodiments of the present disclosure. FIG. 9A provides a non-limiting example of encoding four output segments 405a-d, using parallel transcoder devices 134 (FIG. 1). FIG. 9A depicts a non-limiting example of using a video quality level 906 to maintain a relatively constant subjective quality for constant BR and variable BR systems. Additionally, FIG. 9A depicts a non-limiting example of using a video quality level 906 to achieve a target average BR for variable BR systems.

Each output segment 405a-d is arranged along a y-axis in terms of presentation order. Output segment A 405a is first to be presented, output segment B 405b is immediately next, output segment C 405c immediately follows output segment B 405b, and output segment D 405d immediately follows output segment C 405c in presentation order.

Each output segment 405a-d is also arranged along an x-axis in terms of transcode order. Output segment A 405a, output segment B 405b, and output segment C 405c are encoded at approximately the same time by corresponding encoders 158 (FIG. 1). Output segment D 405d is encoded after the parallel encoding of output segment A 405a, output segment B 405b, and output segment C 405c.

For each output segment 405a-d, FIG. 9A depicts a corresponding video quality level (VQL) 906a-d. As shown in the non-limiting example of FIG. 9A, Output segment A 405a, output segment B 405b, and output segment C 405 are encoded in parallel and have the same video quality level 906a-c. Output segment D 405d is encoded at a later point in time and has a lower video quality level 906d than the video quality levels 906a-c of the other segments.

The video quality level 906 may be a value that is based at least upon a nominal QP, a QP, a QP range, any encoder parameter, or any combination thereof. According to various embodiments, the transcode manager 123 may specify a video quality level 906 for each of the encoders 158 processing the output segments 405a-d to achieve a relatively continuous subjective video quality at the boundaries of adjacent output segments 405a-d. Each encoder 158 may autonomously adjust its respective QP value in accordance with a specified video quality level 906. In this respect, each encoder 158 may vary a QP 159 according to the video quality level 906. In addition, in this respect, each encoder 158 may vary a QP 159 according to aspects of the video being encoded, for example an estimate of the subjective effect of quantization on the video. The video quality level may be assigned by a transcode manager 123 for managing the continuity of subjective quality from one segment to the next. As discussed in further detail below, the transcode manager 123 assigns a video quality level 906 to one or more encoders 158 to maintain a relatively constant subjective quality across the output segments 405a-d.

In the case of a variable bit rate system, each encoder 158 may autonomously adjust its respective QP value according to the specified video quality level 906 and autonomously adjust a respective BR to maintain desirable rate buffer behavior according to the specified video quality level 906. As discussed in further detail below, the transcode manager 123 assigns a video quality level 906 to one or more encoders 158 to maintain a relatively constant subjective quality across the output segments 405a-d while maintaining a target average BR.

For example, in a variable BR system, the transcode manager 123 may obtain a target average BR as a user specification. The target average BR may be expressed as a desired average BR over a particular interval of time. As a non-limiting example, the target average BR may be 4 Mbits per second over a five minute window of time. As another non-limiting example, the target average BR may be 4 Mbits per second over an entire file. The various transcoder devices 134a-n that generate the output segments 405a-d may report a respective BR 162 that is used by a corresponding encoder 158. Alternatively, the transcode manager 123 may determine the BR by analyzing the transcoded bit stream. Based on the determined BRs 162, the transcode manager 123 may determine a measured average BR according to an averaging window. For example, the transcode manager 123 may identify a respective BR 162 for a set of output segments 405a-d that fall within an averaging window of five minutes of presentation time. To this end, each of the output segments 405a-d of FIG. 9A may affect the measured average BR.

In various embodiments, the video quality level 906 comprises a nominal QP. In constant BR and variable BR systems, each encoder 158 may vary the QP 159 based on a nominal QP. The encoder 158 may adjust the QP 159 according to the nominal QP by incrementally deviating away from the nominal QP. The encoder 158 may then attempt to return to the nominal QP. The transcode manager 123 may specify a maximum rate of change of QP to cause the encoders 158 to slowly vary QP 159 from the nominal QP. Ultimately, by assigning a nominal QP to a sequence of output segments 405a-c, the transcode manager 123 may reduce the likelihood of disjointed QPs 159 between adjacent output segments 405a-d.

With regard to variable BR systems, the transcode manager 123 may compare the average BR measured over a window of time to a target average BR to determine whether the average BR over a window of time is at risk of falling outside the target average BR. The transcode manager 123 may determine whether to adjust the video quality level 906 for one or more encoders 158 based on a variety of factors. Non-limiting examples of these factors include the difference between the measured average BR and the target average BR, the rate of change of the measured average BR, a short term average BR, a long term average BR, an average BR from the beginning of the stream, or any combination thereof. For example, if the transcode manager 123 determines that the measured average BR is projected to exceed the target average BR, the transcode manager 123 may adjust the video quality level 906 for one or more encoders 158 that are processing output segments 405a-d.

In constant BR and variable BR systems, the transcode manager 123 may be configured to ensure that a relatively constant QP is maintained at the boundaries of output segments 405a-d. As shown in FIG. 9A, to achieve a relatively continuous QP 159 between output segment C 405c and output segment D 405d, the transcode manager 123 may adjust the video quality level 906 at an adjustment point 912. At the adjustment point 912, the transcode manager 123 instructs one or more encoders 158 to adjust the video quality level 906d in order to achieve a relatively continuous subjective quality between output segment C 405C and output segment D 405d. For example, the transcode manager 123 and the one or more encoders 158 may achieve a relatively continuous subjective quality between adjacent segments by utilizing a relatively continuous QP 159 across the boundaries between adjacent segments.

In variable bit rate systems, the transcode manager 123 may be configured to ensure that a target average BR is achieved. The transcode manager 123 may adjust the video quality level 906 to direct the average BR towards the target average BR. As shown in FIG. 9A, the transcode manager 123 adjusts the video quality level 906 at an adjustment point 912. An adjustment in the video quality level 906 may influence an encoder 158 to encode a segment in a manner that results in an adjustment in BR 162. To this end, the transcode manager 123 may achieve a relatively continuous subjective quality while maintaining a target average BR. For example, to cause the actual average BR over a window of time to increase, the transcode manager 123 may increase the video quality level. In response, one or more encoders may lower their respective QP while constrained by the video quality level specified by the transcode manager 123. Thus, the transcode manager 123 is configured to adjust a video quality level, QP range, nominal QP, or any other encoder parameter at an adjustment point 912 to influence the actual average BR.

Figure 9B:
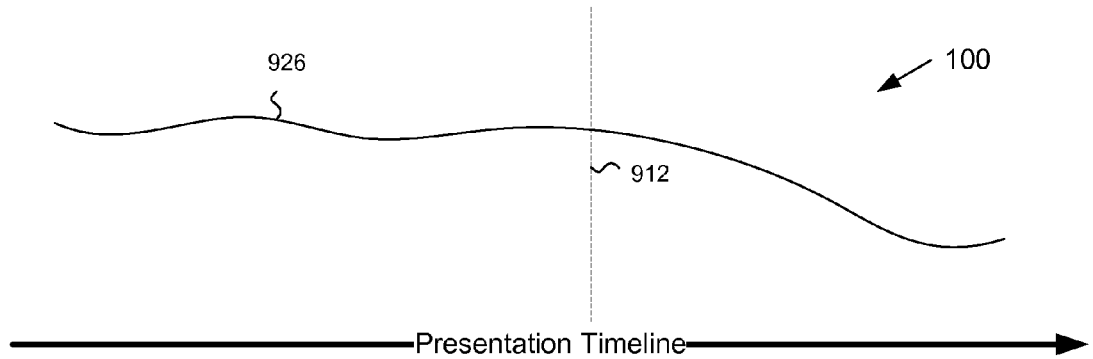

With reference to FIG. 9B, shown is an example of the operation of the transcoding system 100 of FIG. 1, in accordance with various embodiments of the present disclosure. Specifically, FIG. 9B further elaborates upon the non-limiting example of FIG. 9A in the case of a variable BR system. FIG. 9B illustrates a measured average BR 926 over a window of time. The measured average BR 926 may be a rolling average that is determined by a transcode manager 123 (FIG. 1) according to an averaging window. The transcode manager 123 compares the measured average BR 926 to a target average BR. For example, the transcode manager 123 may comprise a linear control loop that is used to manage BRs of various segments to achieve a target average BR. The linear control loop may receive the measured average BR 926 as an input. To control the actual average BR, the transcode manager 123 may adjust the video quality level 906 (FIG. 9A). As shown in FIG. 9B, the transcode manager 123 adjusts the video quality level 906 at an adjustment point 912. In response to adjusting the video quality level 906, the measured average BR 926 is eventually reduced.

The measured average BR 926 before the adjustment point 912 may be based at least in part upon the actual BR of Output segment A 405a, Output segment B 405b, and/or Output segment C 405c. The measured average BR 926 after the adjustment point may be based at least in part upon Output segment D 405d.

Figure 10:
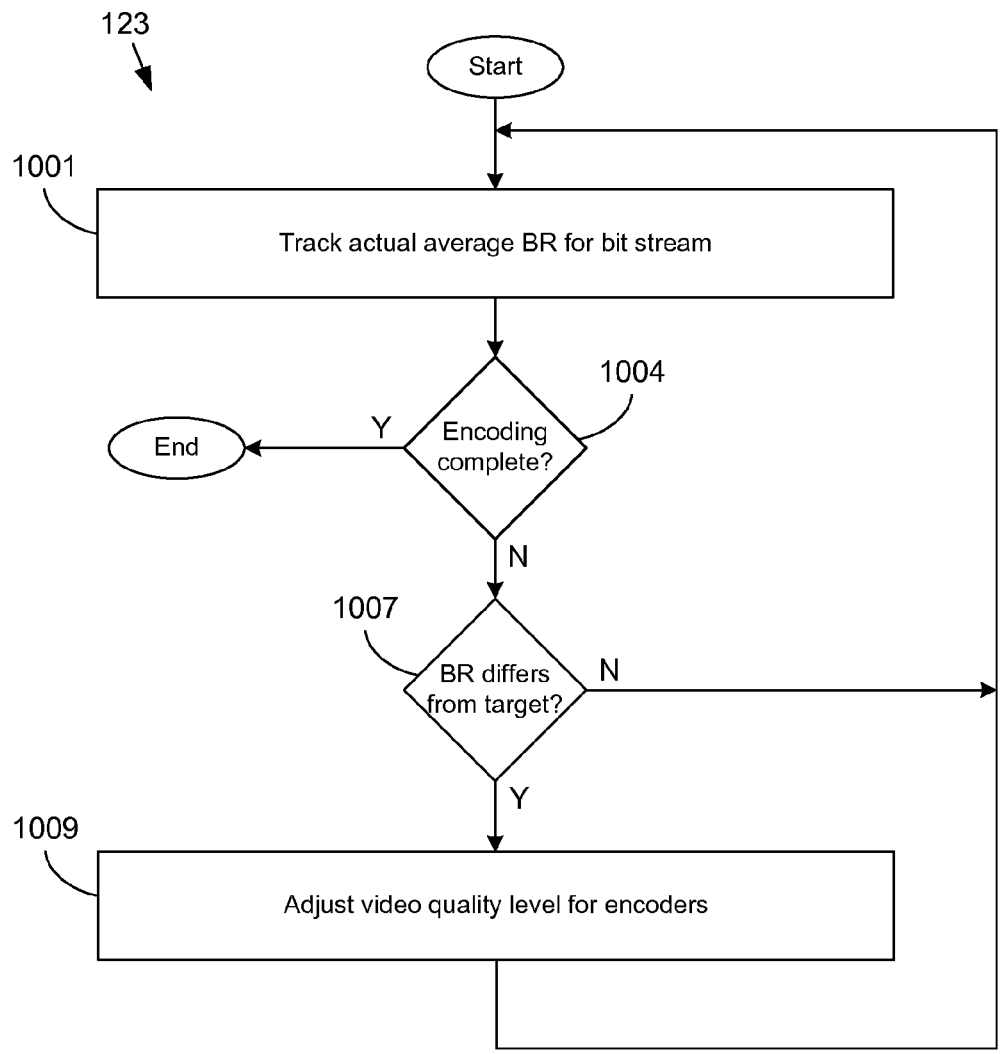
FIG. 10 is a flowchart illustrating an example of functionality implemented as another portion of the transcode manager of FIG. 1, in accordance with various embodiments of the present disclosure.

Referring next to FIG. 10, shown is a flowchart illustrating examples of functionality implemented as portions of the transcode manager 123 of FIG. 1, in accordance with various embodiments of the present disclosure. It is understood that the flowchart of FIG. 10 provides merely an example of the many different types of functional arrangements that may be employed to implement the operation of the transcode manager 123 as described herein. As an alternative, the flowchart of FIG. 10 may be viewed as depicting an example of steps of a method implemented in the transcode manager 123 according to one or more embodiments. FIG. 10 provides a non-limiting example of controlling a set of encoders 158 (FIG. 1) to encode segments of a bit stream in parallel. Each encoder 158 encodes a constituent segment of the bit stream (e.g., an output segment 405 (FIG. 4), etc.). Moreover, FIG. 10 depicts a transcode manager 123 that is configured to manage the parallel encoding of a bit stream to ensure a relatively continuous subjective video quality across the encoded segments while achieving a target average BR in a variable BR system.

To begin, at reference number 1001, the transcode manager 123 tracks the measured average BR for a bit stream. The bit stream may be divided into a set of segments where each segment is to be encoded by a corresponding encoder 158. Each encoder 158 encodes a respective segment and the transcode manager tracks the measured average BR of the transcoded stream. For example, the measured average BR may be determined using a rolling averaging window along a presentation timeline. To this end, the measured average BR for the bit stream may be continually updated as the various segments are encoded. In some embodiments, the encoders 158 report the BR for each segment as the segment is encoded. In other embodiments, the transcode manager 123 analyzes the encoder 158 outputs to determine the measured average BR.

The transcode manager 123 continues to track the measured average BR for the bit stream until encoding of the bit stream is complete, as shown at reference number 1004. At reference number 1007, the transcode manager 123 determines whether the measured average BR differs from a target average BR according to a threshold amount or to a tolerance. For example, the transcoder manager 123 may use a control loop to implement a linear control system to manage the BRs of the various segments to meet a desired long term average bit rate. The control loop may comprise, for example, a proportional, integral and differential, controller.

In various embodiments, the control loop determines a measured short term average BR, a measured long term average BT, a total measured average BR since the beginning of the bit stream or file, or any combination thereof. A short term average may be, for example, based on an averaging window that has the length of one or a few segments. A long term average may be, for example, based on an averaging window that has the length of 5 minutes, or any other period of time that is substantially long. The control loop may determine the difference between the target average BR and each of a plurality of different measured average BRs to determine whether to adjust a video quality level. In this respect, a difference between a short term measured average BR and the target average BR is a first difference value. A difference between a long term measure average BR and the target average BR is a second difference value. And, a difference between the total average BR and the target average BR is a third difference value. Each of these difference values may be weighted according to coefficients and combined to determine whether to adjust encoder settings to influence the BR of the bit stream.

If the measured average BR is not at risk of substantially deviating from the target average BR range, then the transcode manager 123 continues tracking the average BR for the bit stream without adjusting the video quality level 906 (FIG. 9A). However, if the measured average BR is at risk of substantially deviating from the target average BR range, then the transcode manager 123 branches to reference number 1009.

At reference number 1009, the transcode manager 123 adjusts a video quality level 906 for one or more encoders 158. According to various embodiments, the video quality level 906 is a quantitative parameter that expresses a subjective video quality. In alternative embodiments, the video quality level is an inverse of a QP parameter. In alternative embodiments, the video quality level is a QP parameter. The video quality level 906 may positively correlate with the BR of the bit stream. By adjusting the video quality level 906, the transcode manager may instruct those encoders 158 that are currently encoding and/or scheduled to encode segments. In response to the adjusted video quality level, encoders 158 may adjust their respective QPs, nominal QPs, or any other encoder parameter to account for the modified video quality level 906. Following completion of reference number 1009, the transcode manager 123 returns to reference number 1001, tracking the measured average bit rate of the bit stream.

According to various embodiments adjusting the video quality level by the transcode manager 123 may comprise instructing one or more encoders 158 to direct the QP of a respective segment towards a particular QP range or nominal QP value.

The flowcharts of FIGS. 7, 8, and 10 show the functionality and operation of an implementation of portions of the transcode manager 123 (FIG. 1). If embodied in software, each reference number, depicted as a block, may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the transcode manager 123 in a computer system or other system. The program instructions may be stored in a memory. The machine code may be converted from the source code, etc. If embodied in hardware, each block may represent a circuit or a number of interconnected circuits to implement the specified logical function(s).

Although the flowcharts of FIGS. 7, 8, and 10 show a specific order of execution, it is understood that the order of execution may differ from that which is depicted. For example, the order of execution of two or more blocks may be scrambled relative to the order shown. Also, two or more blocks shown in succession in FIGS. 7, 8, and 10 may be executed concurrently or with partial concurrence. Further, in some embodiments, one or more of the blocks shown in FIGS. 7, 8, and 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code, for example, code or instructions to execute portions of the transcode manager 123, can be embodied in any non-transitory computer-readable medium for use by or in connection with an instruction execution system such as, for example, transcode manager 123 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
   a memory for storing a media file;
   a plurality of transcoders configured to transcode at least a portion of the media file in parallel by performing a respective transcoding process, the respective transcoding process including encoding portions of the media file according to a respective quantization parameter (QP); and
   a transcode manager configured to:
      divide the media file into a plurality of segments;
      send respective segments of the divided plurality of segments to respective transcoders of the plurality of transcoders to generate corresponding output segments; and
      instruct the respective transcoders receiving the divided plurality of segments to converge the respective QP to obtain a predetermined final QP, the predetermined final QP comprising a predetermined QP range or a predetermined QP value.

2. The system of claim 1, wherein the transcode manager is further configured to initialize the respective QP for the corresponding transcoder processes.

3. The system of claim 1, wherein the plurality of segments comprises a first segment and a second segment, the second segment being subsequent to the first segment in presentation order, wherein the transcode manager is further configured to determine the predetermined final QP for the first segment based at least upon an initialized QP for the second segment.

4. The system of claim 1, wherein the plurality of transcoders are configured to report to the transcode manager the respective QP.

5. The system of claim 1, wherein the transcode manager is further configured to adjust the predetermined final QP.

6. A method comprising:
   dividing a bit stream into a plurality of segments;
   allocating the plurality of segments to a plurality of transcoders, the plurality of transcoders being configured to encode at least a portion of the plurality of segments in parallel, the plurality of transcoders being configured to encode respective segments and to determine respective bit rates for the respective segments;
   determining an average bit rate of at least a portion of the plurality of segments; and
   comparing the average bit rate with a target average bit rate to determine whether to adjust a video quality level based at least in part on a nominal quantization parameter (QP) value, the video quality level being associated with encoding the plurality of segments.

7. The method of claim 6, wherein a plurality of encoders are configured to encode the respective segments by determining a QP for the respective segments.

8. The method of claim 7, wherein the plurality of encoders are further configured to adjust the QP for the respective segment according to the video quality level.

9. The method of claim 6, wherein determining the average bit rate of at least a portion of the plurality of segments comprises determining the average bit rate according to an averaging window.

10. The method of claim 6, wherein the plurality of transcoders are further configured to report the respective bit rates of the respective segments to a transcode manager.

11. A system, comprising:
 a transcode manager configured to:
  segment a media file to generate a first segment and a second segment;
  initiate a first encoder to process the first segment;
  initiate a second encoder to process the second segment for encoding in parallel with the first segment;
  assign a video quality level for the first segment and the second segment to maintain a relatively constant video quality level between the first segment and the second segment by assigning at least one of a quantization parameter (QP) value, a QP range, or a nominal QP value for the first segment and the second segment.

12. The system of claim 11, wherein the transcode manager is further configured to:
 segment the media file to generate a third segment, the third segment being subsequent to the second segment in presentation order;
 initiate an encoding of the third segment; and
 adjust the video quality level for the third segment to maintain a relatively constant video quality level between the second segment and the third segment.

13. The system of claim 12, wherein the transcode manager is further configured to:
 determine an average bit rate based at least upon a portion of the media file, the portion of the media file comprising the first segment and the second segment;
 compare the average bit rate to a target average bit rate to determine whether to adjust the video quality level for the third segment.

14. The system of claim 13, wherein determining the average bit rate comprises determining a short term average bit rate, wherein the transcode manager is further configured to determine a long term average bit rate to determine whether to adjust the video quality level for the third segment.

15. The system of claim 12, wherein adjusting the video quality level comprises adjusting at least one of a QP value, a QP range, or nominal QP value for the third segment.

16. The system of claim 12, wherein the transcode manager comprises a control loop to determine whether to adjust the video quality level for the third segment.

17. The system of claim 11, wherein the first encoder and the second encoder are configured to perform variable bit rate encoding.

18. The system of claim 11, wherein the first encoder and the second encoder are configured to perform constant bit rate encoding.

* * * * *